Sept. 12, 1944. W. T. CRIGHTON 2,358,214
METHOD FOR PRODUCING BUTTER-FATS
Original Filed Sept. 3, 1938 2 Sheets-Sheet 2
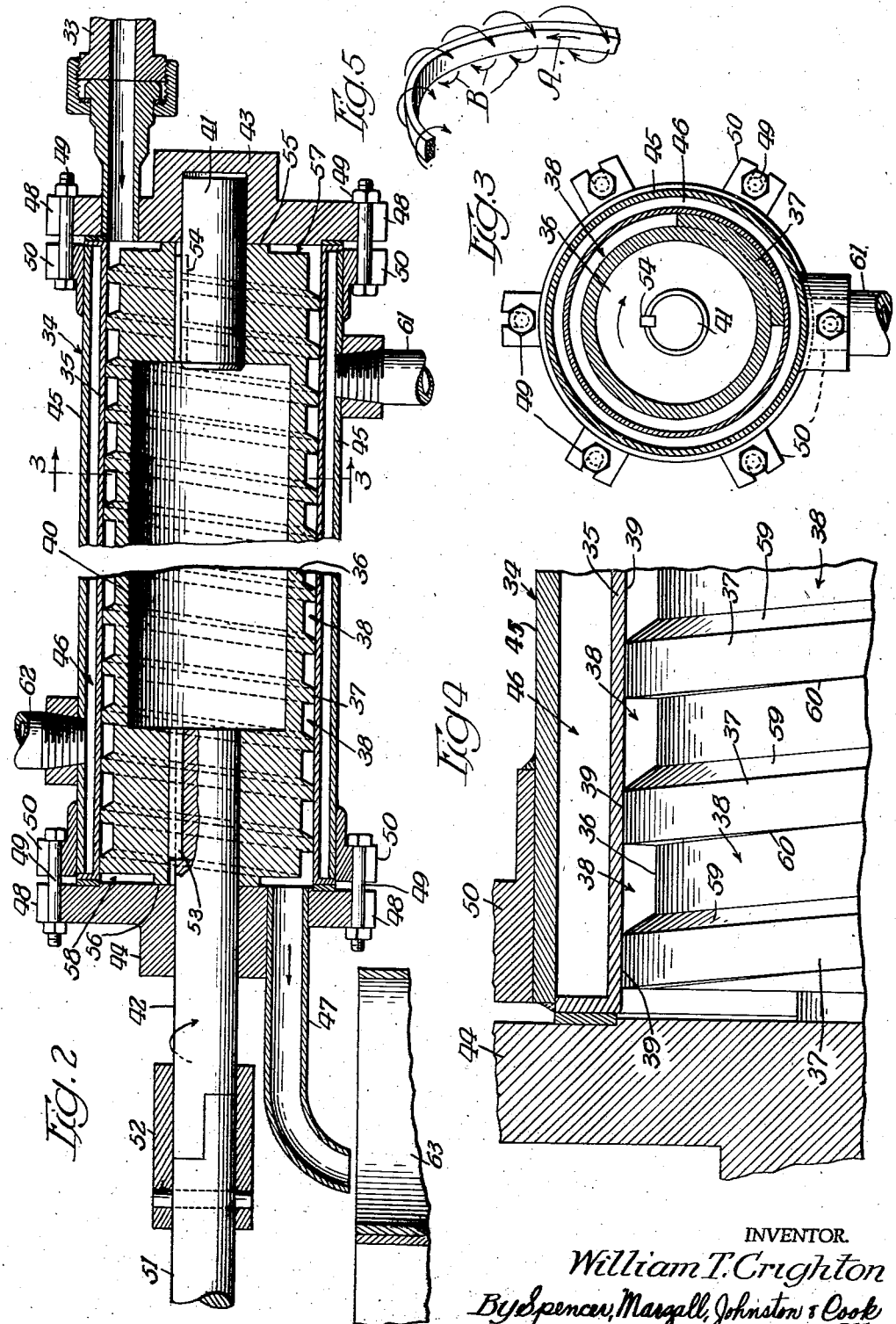
INVENTOR.
William T. Crighton
By Spencer, Margall, Johnston & Cook
Attys Patented Sept. 12, 1944

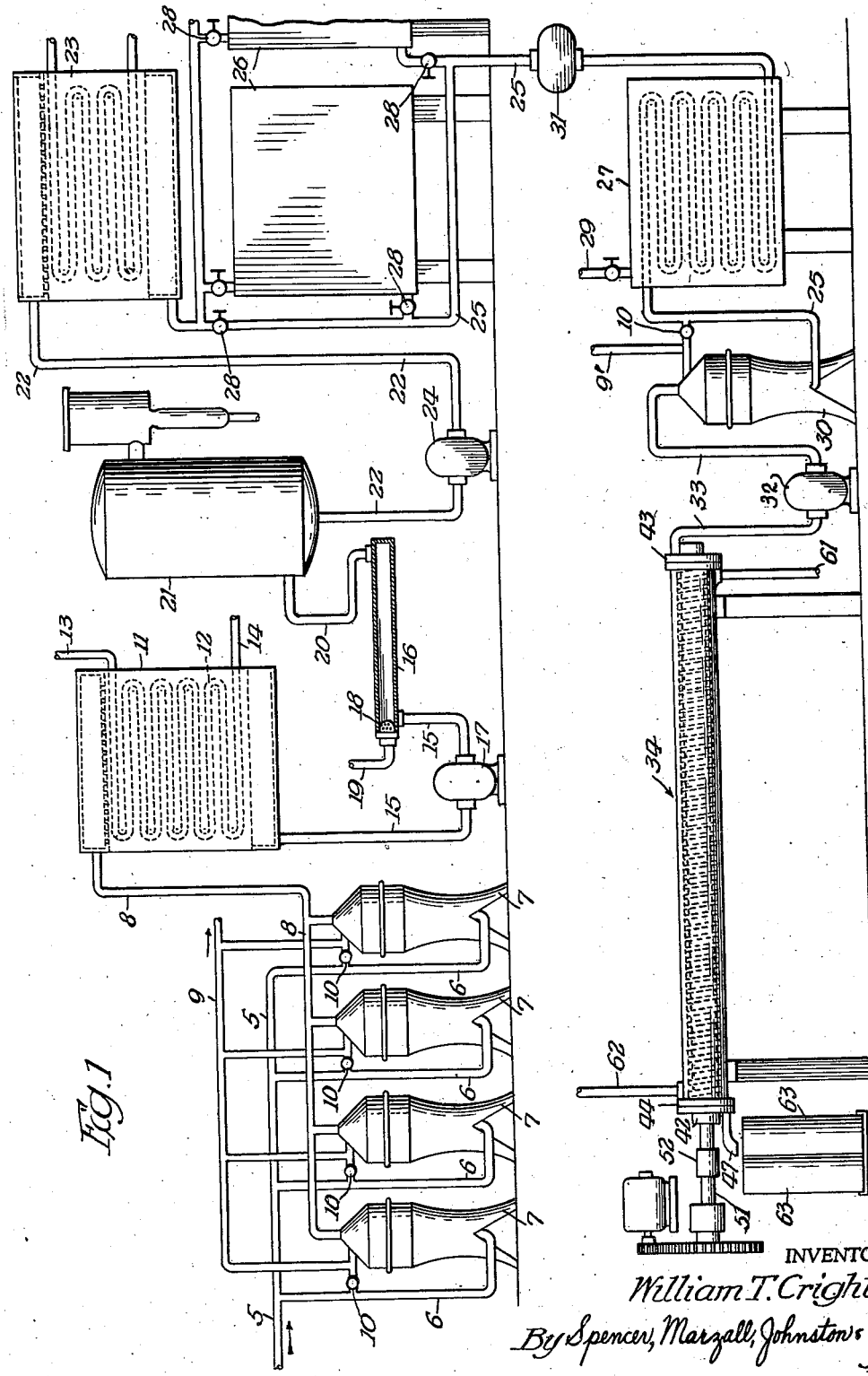

2,358,214

UNITED STATES PATENT OFFICE 2,358,214

METHOD FOR PRODUCING BUTTERFAT

William T. Crighton, Springfield, Mo., assignor to Producers Creamery Company, Springfield, Mo., a corporation of Missouri Original application September 3, 1938, Serial No. 228,343. Divided and this application May 5, 1941, Serial No. 391,940

11 Claims. (Cl. 99—62)

This invention relates to a method for producing cream having a high content of butter-fat. This application is a division of applicant's co-pending application, Serial Number 228,343, filed September 3, 1938, now Patent No. 2,267,081, dated December 23, 1941.

The primary object of the present invention is the provision of new and improved means for treating milk to produce heavy cream containing approximately 75% to approximately 90% butter-fat and maintaining the cream at predetermined temperatures, but in all cases in an airtight system, so that the cream will at no time become exposed to the air.

Another object of the invention is to provide a process for pasteurizing the cream at high temperatures, discharging it into a vacuum, where it is partially cooled, then separating and cooling in an internal arrangement so that the cream will not be exposed to the air at any time during the process and to insure a resultant product which will remain free from oxidized or storage flavors during the time the product is held in cold storage.

Another object of the invention is the provision of new and improved means for separating the milk into a predetermined percentage of butter-fat, and subjecting the cream to heating jets where a temperature of approximately 190° to approximately 250° Fahrenheit is maintained so as to destroy or render inactive all or any enzymes which may affect the keeping quality of the finished products, and to remove the volatile flavors from the cream as it passes through the system.

Another important object of the invention is the provision of an airtight separating, pasteurizing, cooling, and cooled feeding system whereby the milk is fed into the system and then subjected to various operations or processes to reduce the cream to a high percentage of butter-fat, at the same time keeping the cream continuously moving throughout the system and subsequently cooling the cream by passing the high percentage of butter-fat through a new and novel cooling apparatus, whereby the heavy content of butter-fat cream is continuously fed.

A still further object of the invention is the provision of a new and simple process which consists in feeding the milk to predetermined zones at predetermined temperatures, and separating and pasteurizing the cream and then passing the high content butter-fat cream through a novel cooling arrangement, keeping the cream out of contact with the atmosphere at all stages of the operation throughout the entire system, whereby a continuous stream of high content butter-fat cream constantly flows from the system.

Still another object of the invention resides in a new and novel method for treating cream having a relatively high content of butter-fat whereby the cream is fed by means of a screw element whereby the cream will be constantly caused to flow against the side walls and continuously kept in motion but there will be no churning effect so as to break the surface tension of the fat globules.

Another object of the invention is to provide a process for pasteurizing the cream at high temperatures, discharging it into a vacuum, where it is partially cooled, then separating and cooling in an internal arrangement so that the cream will not be exposed to the air at any time during the process, and to insure a resultant product which will remain free from oxidized or storage flavors during the time the product is held in cold storage.

Numerous other objects and advantages will be apparent throughout the progress of the following specification.

The accompanying drawings illustrate a selected embodiment of the invention and the views therein are as follows:

Fig. 1 is a detail schematic or diagrammatic view showing the apparatus used in connection with the process and for carrying out the process;

Fig. 2 is a longitudinal sectional view of the cooling element and embodying the invention;

Fig. 3 is a detail sectional view on the line 3—3 of Fig. 2;

Fig. 4 is a detail sectional view of a part of the improved cooling apparatus, being drawn the full size scale of an actual embodiment; and Fig. 5 is a diagrammatic view showing the path of travel of the cream in the cooler.

The particular apparatus herein disclosed for the purpose of illustrating the invention comprises a pipe line 5 leading to a supply tank or other source of supply containing milk, the temperature of which is approximately 90° to 95° Fahrenheit, having the usual butter-fat content of approximately 4%. The pipe line 5 feeds into the lines 6 which lead to and are operatively connected to one or more separators 7. The cream from the separators passes into a feed line 8, while the resultant fluid product, usually termed skim milk, is fed into the pipe line 9 leading to a proper receptacle or tank not shown. If desired, the valves 10 may be used to return the milk to the separator for further separating before passing it to the line 9. After the milk has passed through the separator the cream will be in the line 8 and this cream will have a butterfat content of around 40% and will be substantially at a temperature of from about 70° to 80° Fahrenheit.

The pipe line 8 carrying the 40% cream leads to a heater 11 which may contain coils 12 whereby the temperature of the fluid will be raised to approximately 150° to 180° Fahrenheit. The heater 11 may be heated by passing hot water through the pipe 13, circulating the hot water through the heater and about the coils 12 and then out through the discharge pipe 14. The 40% cream in the heater 11, after it is raised to approximately 150° to 180° Fahrenheit, passes through the pipe line 15 to a heater element 16, there being a pump 17 interposed in the line 15 for pumping the cream from the heater 11 through the heater 16. The heater 16 may constitute a closed cylinder or chamber into which projects a steam jet 18 fed by the pipe line 19 leading to a source of steam supply not shown. The steam jet 18 sprays steam into direct contact with the cream in the cylinder 16 and raises the temperature of the cream to a temperature of around 190° to 250° Fahrenheit. The cream is thus pasteurized as it passes through the heater elements 11 and 16. The preheated cream then passes through the pipe line 20 into a vacuum chamber 21 whereby the temperature of the cream will be reduced to approximately 150° Fahrenheit as it passes from the vacuum chamber through the pipe line 22 which leads to a cooler element 23. The passing of the cream through the vacuum chamber eliminates air and removes foreign flavors and odors.

A pump 24 is interposed in the line 22 for pumping the cream from the vacuum chamber 21 into the cooler 23. As the cream passes out of the line 22 into the cooler 23 the temperature of the cream is reduced to a temperature of around 110° to 120° Fahrenheit. From the cooler the cream then passes either directly into the feed line 25 or to one or more storage tanks 26, the cooler and the storage tanks 26 having direct connection with the pipe line 25 leading to a heater element 27, valves 28 being provided so that the fluid may pass either directly from the cooler 23 into the pipe 25 or from the cooler 23 into a storage tank 26 and then into the pipe line 25 by manipulating the valves 28. If the cream is passed from the cooler 23 into storage vats or tanks 26, it is preferable that the cream be reduced to a temperature of approximately 45° Fahrenheit.

The heater 27 is preferably heated by steam coming through the line 29 so that cream passing from the storage vats 26 may be raised to a temperature of between 110° and 120° Fahrenheit. However, inasmuch as the cream in the cooler 23 is at a temperature of between 110° and 120° Fahrenheit, it will merely pass through the heater 27 at the same temperature; that is, when the cream is passed direct from the cooler 23 through the pipe line 25 it will be at the proper temperature desired and maintained at that temperature without being subjected to additional heating treatment. However, if the cream is passed through the storage tanks or vats 26, sufficient steam is let in through the line 29 to raise the temperature of the cream from the vats 26 to the proper operating temperature of 110° to 120° Fahrenheit. The pipe line 25 continues through the heater chamber 27 and leads to a separator 30, there being a pump 31 interposed in the line 25, preferably between the storage vats 26 and the heater 27, to cause the cream to flow into the separator 30.

The separator 30 separates the 40% cream into cream having a content of approximately 80% butter-fat, that is, somewhere between 70% and 90% butter-fat. The resultant cream is relatively heavy, thick, and viscous, and is pumped by a pump 32 at a pressure of from thirty to fifty pounds through the pipe line 33 which leads from the separator 30 to a cooler element 34. After the separation by the separator 30 the separated fluid will pass through the line 9' either to another tank or to the same one which receives milk from the line 9, Fig. 1. The cooler element 34 is the cooler element described in applicant's co-pending application, Serial Number 228,343, filed September 3, 1938, and comprises a cylinder 35 with which the pipe line 33 has communication. Inside the cylinder 35 there is mounted a cylindrical member 36 having a single spirally positioned, spaced, outwardly extending continuous rib 37. The rib 37 extends continuously about the member 36 in a fashion similar to that in which the thread spirals about the core or body of a screw and is, in effect, a screw thread, there being a spaced 38 between each convolution of the rib or thread 37. The rib or thread 37 extends to the inside wall of the cylinder 35, as indicated at 39, Fig. 4. In other words, the outer periphery of the thread or spiral engages the inside surface of the cylinder 35 so as to prevent the material from seeping through between the wall and the contacting surface, but not so tight as to cause any friction. The member 36 may be made in one or more sections as desired, and preferably has its central portion hollow as indicated at 40, Fig. 2, so as to reduce the weight of the structure. The ends of the cylindrical member 36 have shafts 41 and 42, Fig. 2, supported in bearings 43 and 44, respectively, to revolubly or rotatably support the structure. A jacket 45 encases the cylindrical member 36 and is spaced from the walls thereof to provide a fluid passage 46 into which a cooling medium such as brine, refrigerated water, or the like, is fed to cool the walls of the cylinder 35.

The pipe line 33 has communication with the interior of the cylinder 35 at one end thereof, and a discharge pipe line 47 leads from the opposite end of the cylinder 35. It is preferable that the inlet line 33 enter the cylinder at the top thereof, while the discharge line 47 leave the cylinder at the bottom thereof, as clearly shown in Fig. 2.

The bearing members 43 and 44 are constructed to provide end caps or end closures for the cooling element 34, the members 43 and 44 each being provided with wings or extensions 48 to receive the locking bolts 49. The locking bolts 49 also engage complementary wings or extensions 50 properly fixed and fastened to the outer wall of the jacket 45.

A shaft 51 driven by a prime mover, such as an electric motor, rotates the shaft 42 in any suitable manner, such as by the connection 52, Fig. 2. The shaft 42 is fixed to the member 36 in any suitable manner, such as by a key 53, so that rotation of the shaft 42 will cause rotation of the member 36. If desired, the shaft 41 may also be fixed to the member 36 by means of a key 54. The extreme ends of the member 36 engage the members 43 and 44, as indicated at 55 and 56, but the member 36 is cut away at each end to provide the peripheral grooves 57 and 58 to provide spaces respectively for the reception of the material as it enters and leaves the cooling member 34, Fig. 2.

The rib 37 which spirally encircles the body 36 and is preferably made integral therewith, has one edge cut away or beveled or inclined, as indicated at 59, Fig. 4, and its other edge extending up relatively straight, as indicated at 60. The distance of the body member 36 from the inside of the cylinder 35 is relatively shallow and provides the space 38 into which the cream is received. During operation, that is, rotation of the body 36, the cream is caused to contact with the inner peripheral surface of the inner cylinder 35, and due to the straight edge 60 on one side of the tooth or rib and the inclined or beveled surface 59 on the other side of the tooth or rib, the cream will tend to roll about, that is, the cream will not only be caused to follow a continuous spiral path from one end of the cooler to the other and about the periphery of the member 36, as indicated by the directional arrow A, Fig. 5, but it will also be caused to rotate about an axis centrally disposed about the space between the teeth, as shown by the directional arrows B, Fig. 5. Furthermore, the provision of the inclined surface 59 and the straight surface 60 prevents pockets into which the material would be jammed and remain stationary. Therefore, during rotation of the member 36 the cream will be translated along its spiral path as indicated by the directional arrow A, Fig. 5, as well as be rotated in an orbit in the space between the teeth as shown by the directional arrows B, Fig. 5, so as to cause every particle of cream in the spaces between the ribs 37 to come into contact with the inner surface of the cylinder 35. The particular construction of the teeth or ribs is such that the material will flow freely from one end of the cooler to the other and at the same time assume a rotary action, Fig. 5, but still not be compressed or churned, and the fat globules will be maintained in their original condition and surface tension, and will not become broken, thereby distinguishing the particular action employed from a churning action which would destroy or break down the fat globules of which cream is formed.

A pipe line 61, Fig. 2, leads to the space 46 between the cylinder 35 and the outer jacket 45 which surrounds the cylinder and has communication with the space 46. This pipe line 61 is connected to the bottom of the cooling device 34 and is the inlet for refrigerant, such as brine, refrigerated water, or the like, to supply refrigerant to the space 46 entirely surrounding the cylinder 35. This pipe line is positioned at the point where the cream enters the cylinder 35 through the inlet 33 and supplies the cold refrigerant at the point where the material is first received into the cooler 34. An outlet 62, Fig. 2, for the refrigerant is located at the top of the cooler 34 adjacent the discharge end thereof, and the refrigerant which passes through the line 61 will completely encircle the cylinder 35 to cool the walls thereof and is then discharged out through the discharge pipe 62. The space 46 between the outer jacket 45 and the outer walls of the inner cylinder 35 is relatively small so as positively to cause the refrigerant fluid to circulate in a spiral fashion throughout the entire length of the cylinder 35. If the space 46 were not relatively small, the fluid would have a tendency to surge into the system, probably along the bottom thereof, and discharge through the pipe 62 without completely encircling and flowing spirally about the cylinder.

The structure disclosed in Fig. 4 is a full size detail of an actual embodiment which is in actual operation, and shows the spacing and sizes of the device which is in commercial use. The actual cooler 34 which is in operation has the conveyor element approximately 68 inches long and 6 inches in diameter. There is one single spiral coil or rib 37 which constitutes 56 threads spaced approximately 1¼ inches apart. The wall of the inner cylinder 35 is approximately ⅛ of an inch thick, while the outside wall 45 is approximately $\frac{3}{32}$ of an inch thick. The space 46 between the walls 35 and 45 is approximately ½ inch. The space along the core between adjacent ribs or teeth 37 is approximately ⅝ of an inch, the distance across the top of the teeth or ribs 37 being ½ inch. The inclined surface 59 is approximately $\frac{3}{32}$ of an inch wide, measured horizontally. The space 38 between the outside body of the core 36 to the inside edge of the cylinder 35 is approximately $\frac{3}{32}$ of an inch. The bevel 59, which is the beveled portion connecting the left hand edge of each of the lands of the rib 37 to the core 36, Fig. 4, makes an acute angle of approximately 30 degrees with the radial direction, while the opposite edge where the land of the rib or tooth 37 connects with the core 36, is relatively a right angle with respect to the core. This rib construction causes the material to be forced longitudinally of the cooler and causes the material to turn as it is being fed along the convolutions between the ribs and prevents and overcomes any pockets from forming and prevents the fat globules from becoming disintegrated.

The 80% cream which enters into the cooling device 34 from the pipe 33 is at a temperature of approximately from 110° to 120° Fahrenheit, while the cooling medium which enters the pipe line 61 is approximately 30° Fahrenheit, so that proper cooling of the cream as it passes through the cooling conveyor 34 will be effected and the cream will be discharged out of the discharge outlet at a temperature somewhere between 55° and 70° Fahrenheit.

The sizes, dimensions and temperatures herein given relate to an actual operating device, and while they are not critical to the proper operation of the structure, they are given for the purpose of disclosing an actual commercial embodiment which is in successful operation. Naturally, the sizes may be varied to suit the requirements at hand, but it is desirable that the space between the teeth or ribs and the inside wall of the inner cylinder 35 be relatively thin, as indicated, so that the cream as it passes in the convolute spaces between the ribs will become thoroughly cooled at the proper temperature to provide material of the proper consistency.

Receptacles 63 are located adjacent the discharge pipe 47 to receive the material fed through the cooler 34. As soon as a receptacle receives the proper amount of material, it is immediately closed and is ready for shipment and storage purposes.

The herein disclosed method reduces milk to a heavy cream with a high butter-fat content, thereby permitting smaller containers to be used and requiring less space than were the resultant product of less butter-fat content. Furthermore, the apparatus and method herein employed prevent air from coming in contact with the milk and cream, insuring a product which will remain free from oxidized and storage flavors during the time it is held in cold storage. Moreover, all or any enzymes which may affect the keeping quality of the finished product are destroyed or rendered inactive by the use of the herein described method and process. The particular separating, heating, cooling and pasteurizing processes assure a cream product of the proper texture, consistency and quality, and the material from the time it enters into the first inlet pipe until it is discharged out of the discharge pipe 47 of the cooler 34 is not in contact with the atmosphere.

The invention provides a process for separating and pasteurizing cream under pressure, and cooling it in an internal arrangement so that the cream will not be exposed to air. The production of cream of the butter-fat content herein described will carry less curd or milk serum and will, therefore, maintain its normal quality much better during any period held in cold storage. Furthermore, the resultant product is more economical to handle, store, and transport than cream containing a lower percentage of butter-fat.

Changes may be made in the form, construction and arrangement of the parts and the herein described method may be varied within certain degrees without departing from the spirit of the invention or sacrificing any of its advantages, and the right is hereby reserved to make all such changes as fairly fall within the scope of the following claims.

The invention is hereby claimed as follows:

1. The method of producing cream having a high content of butter-fat which comprises passing milk at a predetermined temperature through a separator to produce a medium cream product, passing the product through a heating element to raise the temperature to a predetermined degree, passing the preheated product through a container and subjecting the product in the container to live steam to increase the temperature thereof for pasteurization, then reducing the temperature of the product to a predetermined degree, separating the product to produce cream having a high content of butter-fat, forcing the separated cream into a cooling element, forcing the cream through said element in a spiral path and in the form of a thin continuous strip in contact with a cooled surface, and finally discharging the cream from the cooling element.

2. A method of producing cream having a high content of butter-fat which comprises passing milk at a predetermined temperature through a separator to produce a medium cream product, passing the product through a heating element to raise the temperature to a predetermined degree, passing the preheated product through a container and subjecting the product in the container to live steam to increase the temperature thereof for pasteurization under pressure, then reducing the temperature of the product to a predetermined degree, separating the product to produce cream having a high content of butter-fat, forcing the separated cream into a cooling element, dividing the cream into a thin continuous strip, and moving the strip in a spiral path against a cooled wall of a cylinder.

3. The method of producing cream having a high content of butter-fat which comprises passing milk at a predetermined temperature through a separator to produce a medium cream product, passing the product through a heating element to raise the temperature to a predetermined degree, passing the preheated product through a container and subjecting the product in the container to live steam to increase the temperature thereof for pasteurization, then reducing the temperature of the product to a predetermined degree, separating the product to produce cream having a high content of butter-fat, forcing the separated cream into a cooling element, dividing the cream into a thin continuous strip, moving the strip in a spiral path against a cooled wall of a cylinder, and finally discharging the continuous strip from the cooling element and collecting it in a container.

4. The method of producing cream having a high butter-fat content which comprises, passing milk at a predetermined temperature through a separator to produce a medium cream product, pasteurizing said cream at a high temperature and under pressure, passing the cream into a vacuum chamber to reduce the temperature thereof and expel air therefrom, then cooling the cream still further, passing the cream through a second separator to produce a cream having a high butter-fat content, and finally passing the resultant product against cooled walls in a spiral path.

5. The method of producing cream having a high butter-fat content which comprises, separating milk at a predetermined temperature to produce a medium cream product, passing the cream through a heater to raise the temperature thereof to a predetermined point, subjecting the cream to a spray of live steam to increase the temperature thereof still further, cooling the cream, subjecting the cream to a second separating proces to produce a cream having a high butter-fat content, passing the resulting product in a spiral path against a cooled surface, and causing said product to rotate about an axis in the direction of said path to cause substantially all of said product to contact the cooled surface without churning the product, whereby to produce a substantially homogeneous product.

6. The method of producing a cream having a high butter-fat content which comprises initially separating milk to produce a cream having a butter-fat content of approximately 40% pasteurizing said cream under pressure by passing it to a heating chamber where it is heated to between 150° and 180° F. and then subjecting it to live steam to further raise the temperature thereof to between 190°, and 250° F., passing the cream to a vacuum chamber to thereby cool it to approximately 150° F. and remove the air therefrom, then further reducing the temperature thereof to between 110° and 120° F., passing the cream to a second separator to produce a cream having a butter-fat content of between 70% and 90%, passing the resulting cream in a spiral path against a cooled surface, and causing the resulting cream to rotate in said spiral path about an axis in the direction of said path to cause substantially all of the resulting cream to contact the cooled surface without churning the cream.

7. A method of producing cream having a high content of butter-fat which comprises passing milk at a predetermined temperature through a separator to produce a medium cream product, passing the product through a heating element to raise the temperature to a predetermined degree, passing the preheated product through a container and subjecting the product in the container to live steam to increase the temperature thereof for pasteurization under pressure, then passing the product into a vacuum chamber to reduce the temperature thereof and de-aerate the product, then further reducing the temperature of the product to a predetermined degree, separating the product to produce cream having a high content of butter-fat, forcing the separate cream into a cooling element, dividing the cream into a thin continuous strip, moving the strip in a spiral path against a cooled wall of a cylinder, causing the cream of said strip to rotate about an axis in the direction of said path to cause substantially all the cream to contact the cooled surface, and finally discharging the continuous strip from the cooling element and collecting it in a container.

8. The method of producing cream having a high butter-fat content which comprises, passing milk at a predetermined temperature through a separator to produce a medium cream product, pasteurizing said cream at a high temperature and under pressure, de-aerating and cooling the cream, passing the cream through a second separator to produce a cream having a high butter-fat content, passing the resultant product in a spiral path against a cooled surface, and causing said product to rotate about its axis of progression in said spiral path while avoiding churning of the cream.

9. A method of producing cream having a high butter-fat content which comprises treating cream to provide a pasteurized and de-odorized medium cream product, separating said product to produce a cream of high butter-fat content, passing the resultant product in a spiral path against a cooled surface, and causing said product to rotate about its axis of progression in said spiral path while avoiding churning of the cream.

10. In a process for producing cream having a high butter-fat content and in which a pasteurized and de-odorized cream product is separated into a cream product having a high butter-fat content, the steps which comprise passing the last named cream product in a spiral path against a cooled surface, and causing said product to rotate about its axis of progression in said spiral path while avoiding churning of the cream whereby substantially to homogenize said product.

11. The process of handling cream which consists in passing a body of heated cream having a butter-fat content of 70% or higher in a spiral path against a cooled surface, causing the cream to rotate about an axis in the direction of said path without churning the cream, and withdrawing the cream from said surface and delivering the same to a receptacle in the form of a strip of substantially uniform temperature.

WILLIAM T. CRIGHTON.